US006158758A

United States Patent [19]

Schaaf

[11] Patent Number: 6,158,758

[45] Date of Patent: Dec. 12, 2000

[54] FIFTH WHEEL HITCH BUMPER

[76] Inventor: Thomas Jack Schaaf, 708 Custer Dr., Mandan, N. Dak. 58554

[21] Appl. No.: 09/191,571

[22] Filed: Nov. 13, 1998

[51] Int. Cl.[7] .................................................... B62D 25/12

[52] U.S. Cl. .......................... 280/432; 280/433; 280/507

[58] Field of Search .................................... 280/507, 432, 280/433, 901

[56] References Cited

U.S. PATENT DOCUMENTS

| | | | |
|---|---|---|---|
| 2,641,124 | 6/1953 | Gallagher et al. | 280/433 |
| 2,671,675 | 3/1954 | Swaisgood | 280/507 |
| 3,749,420 | 7/1973 | Johnson et al. | 280/432 |
| 3,887,251 | 6/1975 | McKay | 280/433 |
| 4,620,718 | 11/1986 | Mickelson | 280/507 |
| 5,037,122 | 8/1991 | Beckerer, Jr. | 280/507 |
| 5,098,115 | 3/1992 | Haire et al. | 280/476.1 |
| 5,224,727 | 7/1993 | Ramskugler | 280/432 |
| 5,259,223 | 11/1993 | Nee | 70/232 |
| 5,297,407 | 3/1994 | Tarr | 70/232 |
| 5,343,720 | 9/1994 | Slater | 70/14 |
| 5,411,281 | 5/1995 | Poirier | 280/433 |
| 5,533,743 | 7/1996 | Bello | 280/507 |
| 5,536,031 | 7/1996 | Hurley | 280/507 |
| 5,647,621 | 7/1997 | McClellan | 293/117 |
| 5,651,559 | 7/1997 | Liland et al. | 280/507 |
| 5,681,053 | 10/1997 | Misukanis et al. | 280/507 |
| 5,720,492 | 2/1998 | Wanzenried | 280/433 |
| 5,791,677 | 8/1998 | Froehlich | 280/507 |
| 5,961,140 | 10/1999 | Huskey | 280/507 |
| 5,987,938 | 11/1999 | Frei | 70/14 |

*Primary Examiner*—J. J. Swann
*Assistant Examiner*—Michael Cuff
*Attorney, Agent, or Firm*—Curtis V. Harr

[57] ABSTRACT

A hemispherical bumper plate that is positioned on a fifth wheel hitch in a manner that makes it impossible to inadvertently contact the protruding surface of the hitch itself is provided. The protective properties of the bumper plate are also enhanced by the use of an additional coating of rubber or other elastic material that softens any contact made with the bumper, further the bumper itself may be made of plastic, hard rubber or other suitable material as desired. The present invention is connected to the fifth wheel trailer by the use of a cylindrical locking tube which fits over the kingpin of the fifth wheel hitch and is held in place by a locking pin which passes through the tube and engages the kingpin. The locking tube also has a plurality of outwardly radiating support bars which connect to and support the bumper plate in the desired position to provide the maximum amount of protection for the fifth wheel hitch.

8 Claims, 5 Drawing Sheets

10
20
16
22
24
18

10
16
20
18
24
20

18
22
24
26

FIG 7
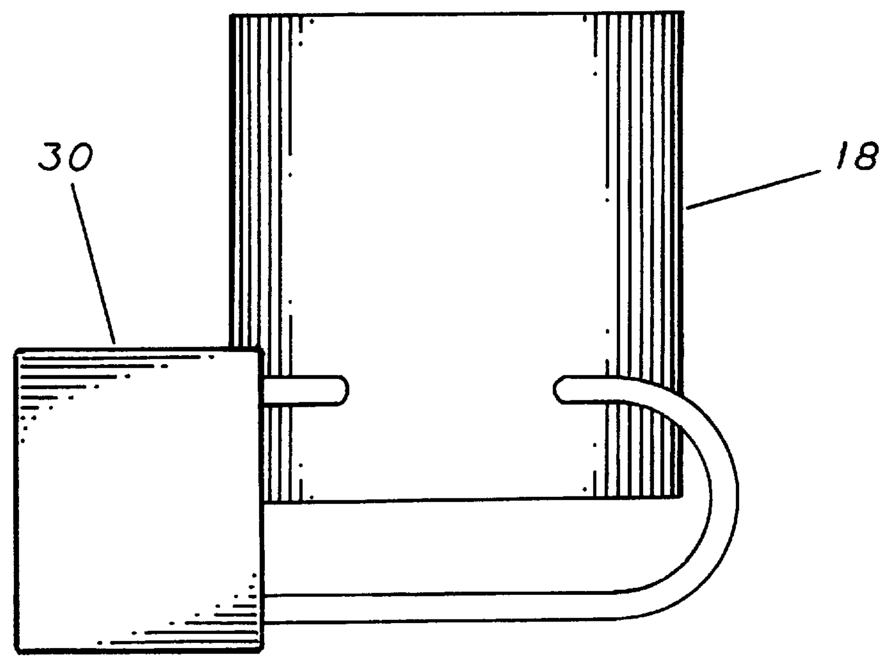
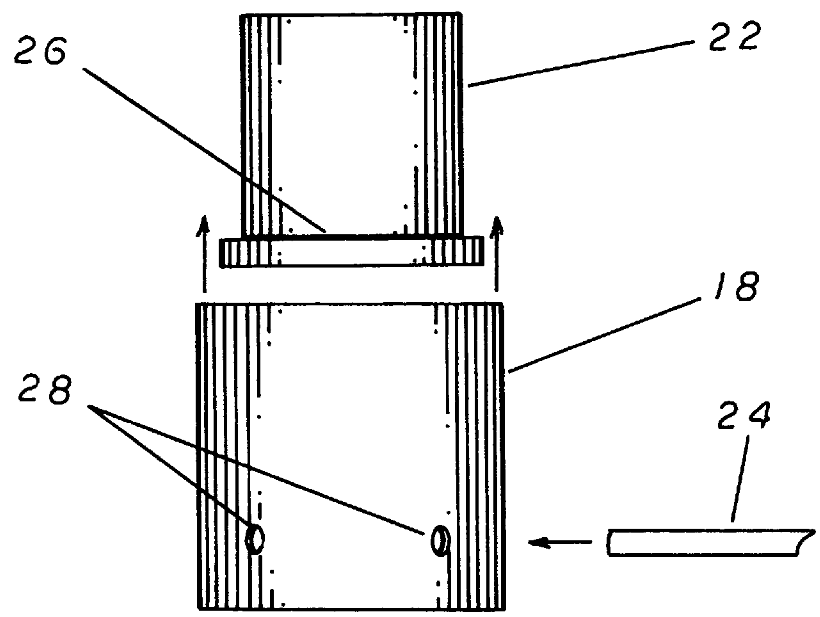
FIG 8

FIFTH WHEEL HITCH BUMPER

BACKGROUND OF THE INVENTION

The present invention relates to an improvement in the methods provided which protect people from inadvertently bumping into and injuring themselves on the sharp edges of a fifth wheel trailer hitch while the trailer is not connected to a towing vehicle. More specifically, to a method of providing a hemispherical bumper which attaches to and encloses the protruding portion of a fifth wheel hitch that is not connected to a towing vehicle.

In recent years the fifth wheel type trailer has began to gain in popularity due to the large sizes with relatively low cost that may be achieved.

Common uses for fifth wheel trailers included campers, cargo trailers, flatbeds and livestock trailers. The fifth wheel trailer has a neck that extends outward and has on its lower side a downwardly extending kingpin. This kingpin pivotally attaches to the bed of a tow vehicle, commonly a pickup type truck. When a user reaches a destination such as show or campground the trailer may be unhooked and placed in a level position with stands, jacks or blocks. In this position the kingpin extends downward in an open area. This can create a problem as the kingpin may not be readily visible in a low light situation or to shorter inattentive people such as children. A common situation may be a child running around a camper, not seeing the kingpin and thus, running into a solid metal pin which may cause serious injury.

A second problem with exposed kingpins is the danger of theft. As fifth wheel type trailers become more popular so does the market for stolen trailers. A trailer sitting with an exposed kingpin may be easily attached to a would be thefts vehicle and taken.

Locks for kingpins as used on tractor trailers have been known, two such examples are shown by U.S. Pat. No. 5,259,223 issued to NEE, and U.S. Pat. No. 4,620,718 issued to MICKELSON. Although these patents address the ability to lock a kingpin so as to prevent movement of the trailer, they do not protect the kingpin from inadvertent contact.

From this discussion it can be readily seen that it would be desirable to provide a means of covering or shrouding an exposed kingpin when a fifth wheel trailer is not in use. This covering should aid in protecting people from running into the exposed kingpin, and minimize injury if an inadvertent contact occurs. This covering or shroud should also be easily installed and removed by a user and not be to heavy or cumbersome. Finally, the covering or shroud should be equipped with a lock so as to prevent the unauthorized removal of the shroud and thus, a subsequent theft of the trailer.

SUMMARY OF THE INVENTION

It is the primary objective of the present invention to provide a method of protecting people from inadvertently contacting the sharp edges of a fifth wheel trailer hitch when the fifth wheel trailer is not in use.

It is an additional objective of the present invention to provide a method that can be quickly and easily installed and removed from the fifth wheel hitch of a fifth wheel trailer by a single person.

It is still a further objective of the present invention to provide such a method that can be securely locked into place once it is installed on the fifth wheel hitch to ensure that it will not be tampered with or removed by an individual other than the primary user.

These objectives are accomplished by the use of a hemispherical bumper plate that is positioned on a fifth wheel hitch in a manner that makes it impossible to inadvertently contact the protruding surface of the hitch itself. The protective properties of the bumper plate are also enhanced by the use of an additional coating of rubber or other elastic material that softens any contact made with the bumper. In other variations the bumper may be made entirely of plastic, hard rubber or other suitable materials as desired. The use of the present invention ensures that inattentive persons will not be injured by running into a fifth wheel hitch while the fifth wheel trailer is not connected to a towing vehicle.

The connection of the present invention to the fifth wheel trailer is accomplished by the use of a cylindrical locking tube which fits over the kingpin of the fifth wheel hitch and is held in place by a locking pin which passes through the tube and engages the kingpin. The locking tube also has a plurality of outwardly radiating support bars which connect to and support the bumper plate in the desired position to provide the maximum amount of protection for the fifth wheel hitch. Additionally, the present invention's locking pin design allows for its installation and removal with a minimal amount of effort from the user.

Finally, the present invention can be supplied with a greater degree of security by using a padlock in the place of the locking pin. This is done by simply placing one end of the padlock's locking bar though the locking pin holes on the locking tube which will hold the present invention in the desired position on the fifth wheel hitch and will not allow for its removal by a person not possessing the correct key for the padlock. This prevents the present invention from being tampered with or removed by anyone other than the owner.

For a better understanding of the present invention reference should be made to the drawings and the description in which there are illustrated and described preferred embodiments of the present invention.

DESCRIPTION OF THE DRAWINGS

FIG. 7 is a rear elevation view of the present invention showing it as used with a padlock device in the place of the locking pin.

FIG. 8 is an exploded view of the locking collar component of the present invention detailing the manner in which the locking collar fits over and engages the kingpin of a fifth wheel hitch.

DESCRIPTION OF THE PREFERRED EMBODIMENT

Figure 1:
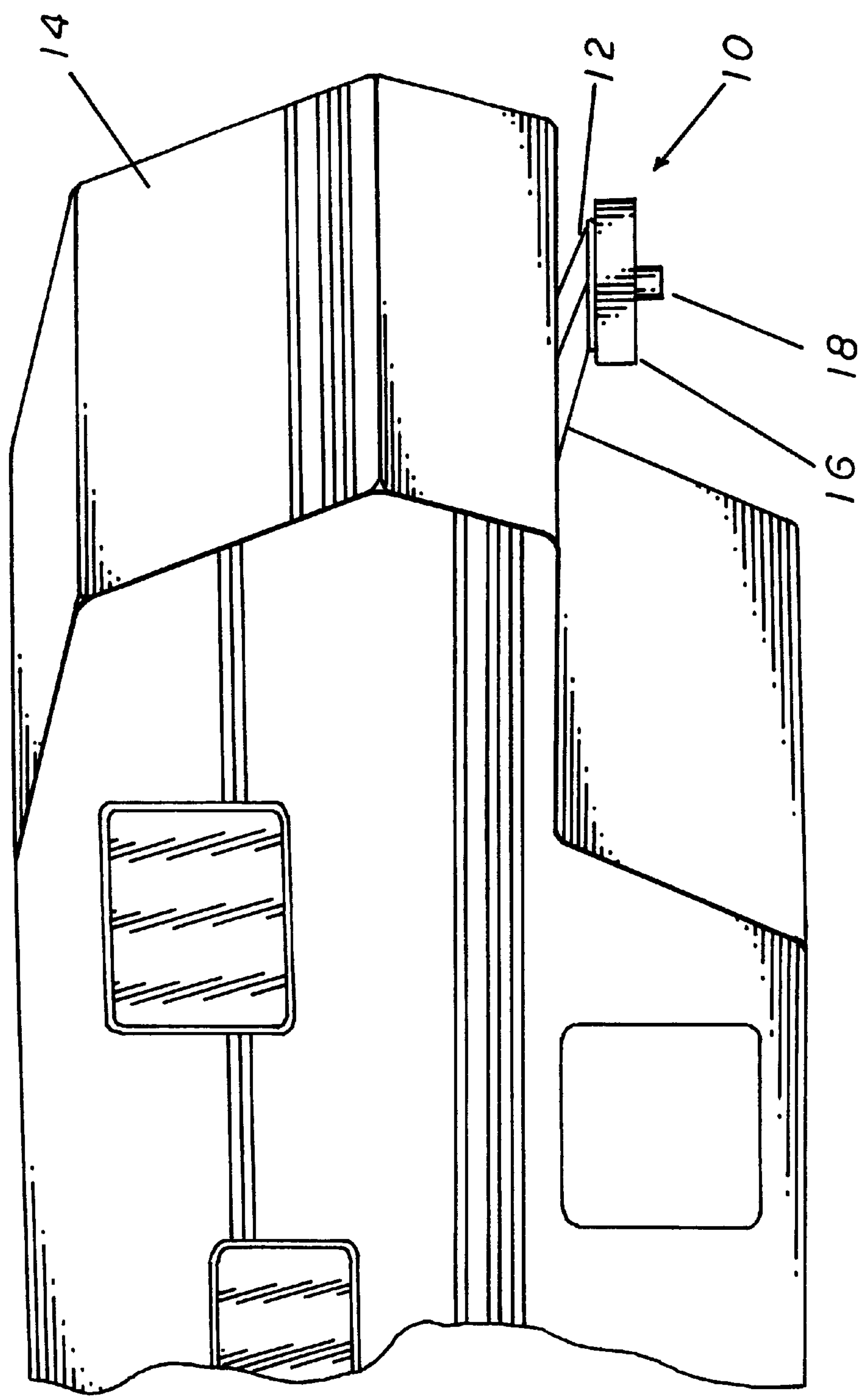
FIG. 1 is a perspective view of the present invention showing its orientation in relation to a fifth wheel trailer and hitch assembly.
Figure 2:
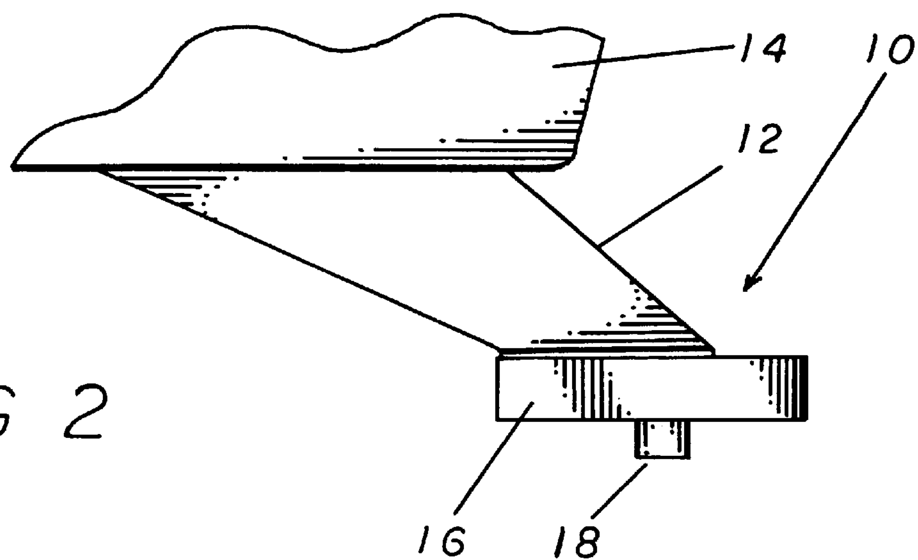
FIG. 2 is a side elevation view of the present invention detailing its orientation and location in respect to a typical fifth wheel hitch.
Figure 3:
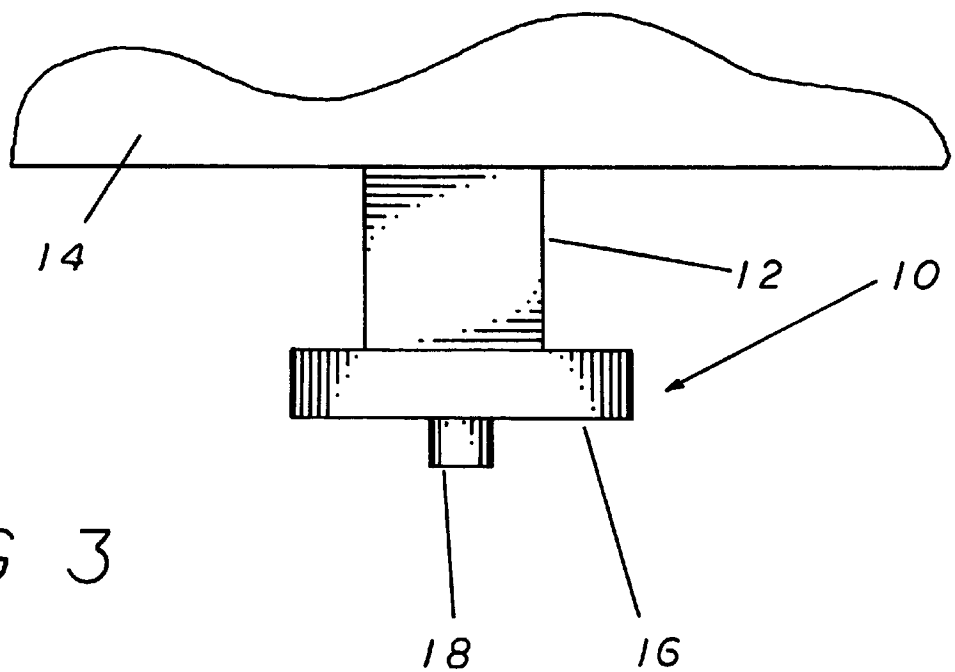
FIG. 3 is a front elevation view of the present invention detailing its orientation and location in respect to a typical fifth wheel hitch.
Figure 4:
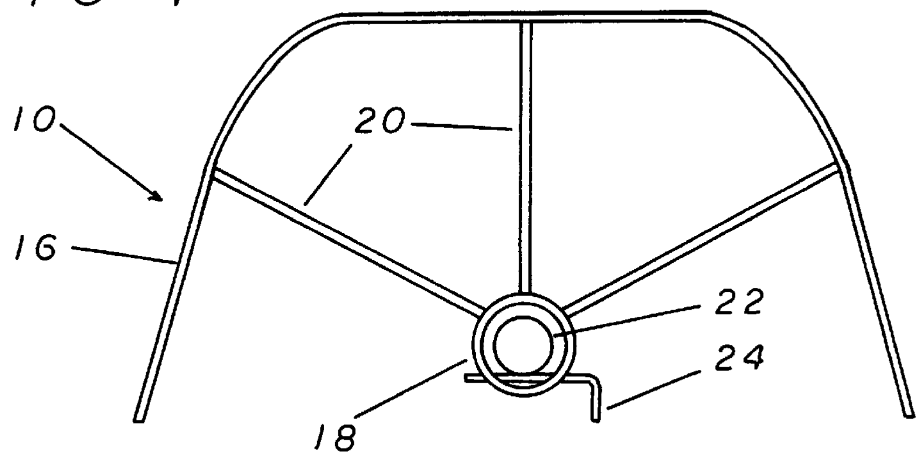
FIG. 4 is a top elevation view of the present invention detailing the manner in which it connects to the kingpin of a typical fifth wheel hitch.
Figure 5:
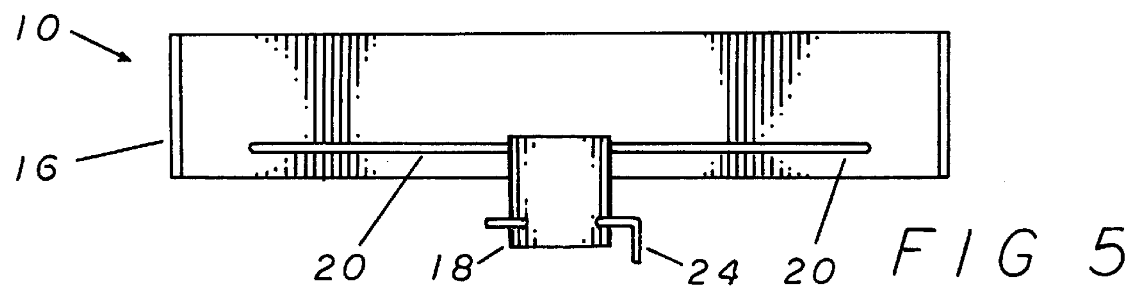
FIG. 5 is a rear elevation view of the present invention detailing its orientation to, and the manner it connects to, a kingpin of a typical fifth wheel hitch.

Referring now to the drawings, and more specifically to FIG. 1, the fifth wheel hitch bumper 10 is made up of a bumper type apparatus that attaches to and extends outward from a fifth wheel hitch 12. The present invention is employed on a fifth wheel hitch 12 while the fifth wheel trailer 14 is not connected to a towing vehicle and it provides a protective barrier that encircles the fifth wheel hitch 12. This is necessary because while the fifth wheel trailer 14 is not attached to a towing vehicle, the fifth wheel hitch 12 is maintained in a position that is approximately shoulder or head height of an average person that can be easily collided with by someone who is not paying close enough attention. The result of this can be serious bodily injury to such a person and the present invention is specifically designed to prevent such accidents.

The method of the present invention's construction and its orientation in relation to the fifth wheel hitch are illustrated in FIGS. 2, 3, 4, 5 and 9. The primary component of the fifth wheel hitch bumper 10 is the bumper plate 16 which is typically made of a heavy gage steel which is then coated with a softer material such as rubber or any other relatively soft elastic type material. While the bumper plate 16 itself prevents unintended collisions with the fifth wheel hitch 12, the elastic material further decreases the likelihood of sustaining an injury from colliding with a fifth wheel hitch 12 by cushioning any unintended contact.

Figure 9:
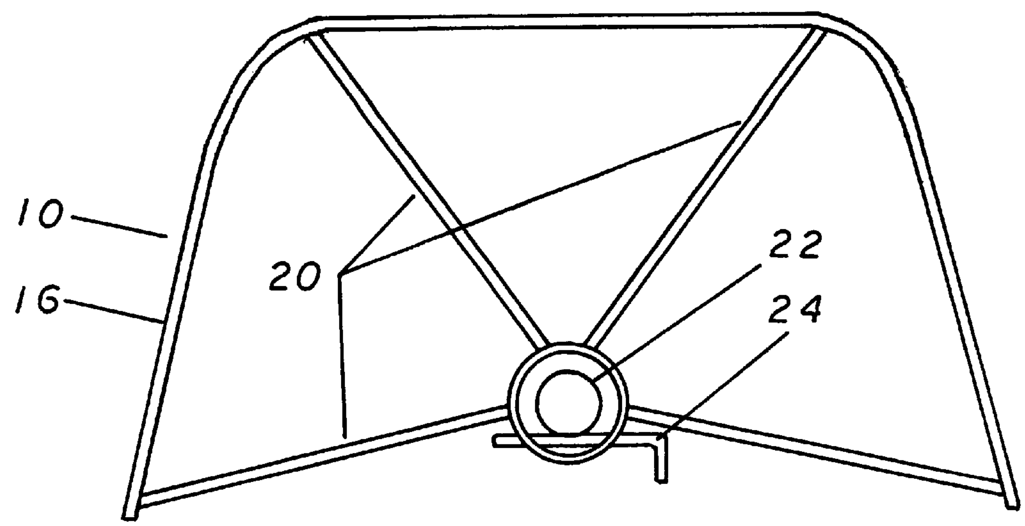
FIG. 9 is a top elevation view of the present invention in one of many possible alternative arrangements detailing the manner in which it connects to the kingpin of a typical fifth wheel hitch.

The primary mounting component of the present invention is the locking tube 18 which is a hollow cylindrical object that is slightly greater in its inside diameter than the outside diameter of the kingpin 22 of the fifth wheel trailer hitch 12. The locking tube 18 fits over the kingpin 22 during the present invention's installation to the fifth wheel hitch 12 and also provides the point at which the bumper plate 16 is attached and held in the proper location surrounding and protecting the fifth wheel hitch 12. This is accomplished by the use of a plurality of bumper support bars 20 which radiate outwardly (in relation both specifically to the surface of the locking tube 18 and generally to the orientation of the fifth wheel hitch 12) from the locking tube 18 to the lower inside surface of the bumper plate 16. It should be stated at this point that many different arrangements of the bumper support bars 20 are possible. One such alternative arrangement is shown by FIG. 9.

This construction method serves to suspend the bumper plate 16 in a hemispherical configuration around the fifth wheel hitch 12. Additionally, the bumper support bars 20 are attached to the locking tube 18 at the upper end of its cylinder and to the bumper plate 16 at its lower inside edge. This holds the bumper plate 16 on a slightly higher horizontal plane than that of the locking tube 18 which allows the user easy access to the locking tube 18 for removal and installation while positioning the bumper plate 16 in the proper location to ensure adequate and complete protection to persons in the direct vicinity of the fifth wheel trailer 12.

Figure 6:
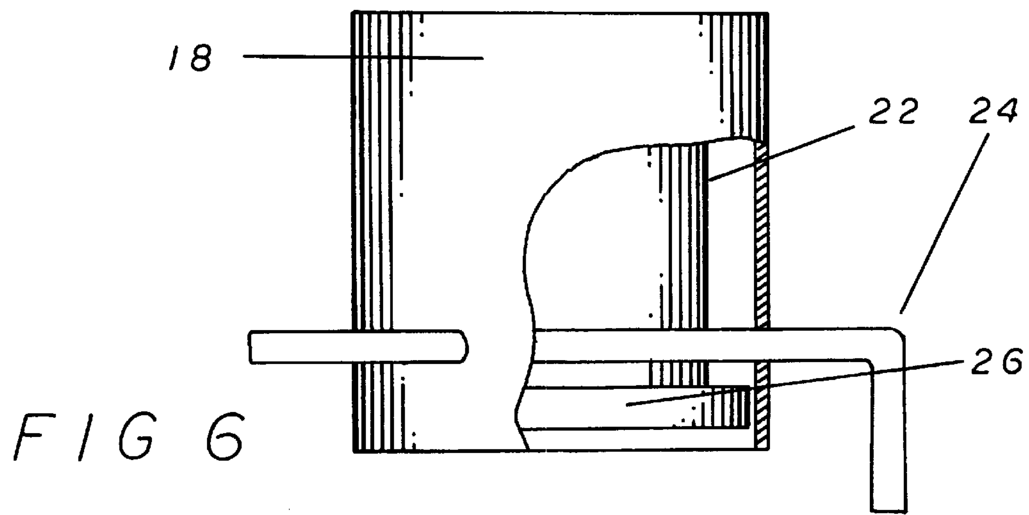
FIG. 6 is a cut-away rear elevation view of the attachment apparatus of the present invention detailing the manner in which the attachment pin engages the kingpin of a typical fifth wheel hitch.

The manner by which the present invention is attached to the kingpin 22 of a typical fifth wheel hitch 12 is further detailed in FIGS. 6 and 8. The typical kingpin 22 of a fifth wheel hitch 12 is equipped with a kingpin collar 26 located at its lowest most surface. The kingpin 22 is cylindrical in its construction and the collar 26 is simply a relatively narrow outward extension of this cylinder. This feature is pivotal in the design of the locking tube 18 of the present invention and in the manner in which the locking tube 18 is attached to the fifth wheel hitch 12.

As previously described, the inside diameter of the locking tube 18 is slightly larger than the outside diameter of the kingpin 22 and, more specifically, just slightly larger than the outside diameter of the kingpin collar 26. To install the present invention to the fifth wheel hitch 12 the locking tube 18 is slipped from the bottom over the kingpin collar 26 and, thereafter, over the kingpin 22 itself. Once this is accomplished, the locking tube 18 is positioned at a point at which the locking pin holes 28 (two parallel holes drilled sequentially through the surface of the lower end of the locking tube 18) are located at a point that they are just above the kingpin collar 26. The locking pin holes 28 allow for the insertion of the locking pin 24 into one and then out the other, in a position that it engages the outside of the kingpin 22 just above the kingpin collar 26. While the locking pin 24 is inserted it will not allow the locking tube 18 to drop below the level of the locking pin 24 which serves to hold the present invention in the desired location. To remove the present invention from the fifth wheel hitch 12 one simply reverses the above described procedures by first removing the locking pin 24 from locking pin holes 28. This described design method allows for the easy installation and removal of the present invention from the fifth wheel hitch 12 of a typical fifth wheel trailer 14.

An alternative embodiment of the locking mechanism of the present invention is illustrated in FIG. 7. While the previously described method of attaching the locking tube 18 to the kingpin 24 works effectively, it lacks a method by which the present invention can be attached that will prevent it from being tampered with or stolen. The design of the locking tube 18 addresses this problem in that it will allow for the use of a padlock 30 in the place of the standard locking pin 24. This allows the present invention to be attached to the fifth wheel hitch in such a manner that only the user can effect its removal by the use of the padlock key.

Although the present invention has been described in considerable detail with reference to certain preferred versions thereof, other versions are possible. Therefore, the spirit and scope of the appended claims should not be limited to the description of the preferred versions contained herein.

What is claimed is:

1. A fifth wheel hitch bumper for use on a fifth wheel type trailer having a downwardly extending cylindrical kingpin said hitch bumper comprising:

a cover tube defining an inner area for enclosing said cylindrical kingpin said cover tube having a top section and bottom section and an outer surface;

a locking means for holding said cover tube about said kingpin;

a bumper means about said cover means; and a plurality of bumper support sections said support sections having a first end fixedly attached to said cover tube and a second end fixedly attached to said bumper means said support sections extending radially out from said cover tube so as to define a void greater than the volume occupied by said bumper support sections.

2. A fifth wheel hitch bumper as in claim 1 wherein said bumper means is a curved plate section forming a perimeter about said cover tube.

3. A fifth wheel hitch bumper as in claim 2 wherein said locking means comprises two openings defined by said cover tube and a pin removably placed through said openings for affixing said cover tube about said kingpin.

4. A fifth wheel hitch bumper as in claim 2 wherein said locking means comprises two openings defined by said cover tube and a locking mechanism for passing through said two openings in order to lockably attach said cover tube to said kingpin.

5. A fifth wheel hitch bumper for use on a fifth wheel type trailer having a downwardly extending cylindrical kingpin with a lower flange said hitch bumper comprising:

a cover section defining an inner area for enclosing said cylindrical kingpin said cover section having a top section and bottom section and an outer surface;

a first and second opening defined by said cover section;

a curved outer bumper about said cover section forming an arc with a first and second end; and at least two support sections for attaching said outer bumper fixedly to said cover section said support sections extending radially out from said cover tube so as to define a void greater than the volume occupied by said bumper support sections.

6. A fifth wheel hitch bumper as in claim 5 further comprising at least three bumper support section said support section(s) having a first end fixedly attached to said cover tube and second end fixedly attached to said bumper means so as to define a void between said bumper and said cover tube.

7. A fifth wheel hitch bumper as in claim 6 further comprising a pin removably placed through said first and second opening for affixing said cover tube about said kingpin by passing above said kingpin flange.

8. A fifth wheel hitch bumper as in claim 6 further comprising a locking mechanism for passing through said first and second openings in order to lockably attach said cover tube to said kingpin.

* * * * *